US008373762B2

(12) United States Patent
Cottagnoud

(10) Patent No.: US 8,373,762 B2
(45) Date of Patent: Feb. 12, 2013

(54) ADJUSTABLE HANDLE, PARTICULARLY FOR CAMERA

(75) Inventor: Camille Cottagnoud, Sion (CH)

(73) Assignee: Caman SA, Sion (CH)

( * ) Notice: Subject to any disclaimer, the term of this patent is extended or adjusted under 35 U.S.C. 154(b) by 162 days.

(21) Appl. No.: 12/706,270

(22) Filed: Feb. 16, 2010

(65) Prior Publication Data

US 2010/0214470 A1 Aug. 26, 2010

Related U.S. Application Data

(63) Continuation of application No. PCT/EP2007/058870, filed on Aug. 27, 2007.

(51) Int. Cl.
*H04N 5/232* (2006.01)
*H04N 5/225* (2006.01)
*G03B 17/00* (2006.01)
*B25G 1/10* (2006.01)

(52) U.S. Cl. ....... 348/211.7; 348/375; 396/56; 396/300; 396/428; 16/430

(58) Field of Classification Search ............... 348/211.2, 348/211.4, 211.7, 211.11, 373, 375, 376; 396/56, 58, 59, 300, 297, 419, 420, 424, 396/428, 425, 426; 345/161; 16/430
See application file for complete search history.

(56) References Cited

U.S. PATENT DOCUMENTS 2,576,751 A * 11/1951 Dortmund ....................... 81/489
3,251,241 A 5/1966 Francis
5,263,275 A * 11/1993 Rumbaugh ....................... 43/23
5,873,148 A * 2/1999 Arnold ............................ 16/430
5,902,006 A * 5/1999 Janker et al. .................. 296/153
6,034,722 A * 3/2000 Viney et al. ................... 348/135
6,169,537 B1 * 1/2001 Taft .............................. 345/163
7,046,236 B2 * 5/2006 Blacklock ..................... 345/179
7,576,770 B2 * 8/2009 Metzger et al. ............... 348/143
7,792,424 B2 * 9/2010 Chen ............................ 396/540
7,965,335 B2 * 6/2011 Niblock ........................ 348/371
2002/0075233 A1 6/2002 White et al.
2003/0160873 A1 * 8/2003 Tecu et al. .................. 348/211.2
2004/0046732 A1 * 3/2004 Chesters ....................... 345/156
2004/0155865 A1 * 8/2004 Swiader ........................ 345/161
2006/0021196 A1 * 2/2006 Blauer et al. .................... 16/431
2006/0123651 A1 6/2006 Tillim
2007/0143942 A1 * 6/2007 Fox et al. ..................... 15/143.1
2008/0036227 A1 * 2/2008 Watanabe ....................... 294/25
2008/0259026 A1 * 10/2008 Zeldin et al. .................. 345/157

(Continued)

FOREIGN PATENT DOCUMENTS

DE 19548714 C1 12/1996
DE 29911042 U1 12/2000

(Continued)

OTHER PUBLICATIONS

Translation of JP 05-048944 A; Feb. 1993.*

(Continued)

*Primary Examiner* — John Villecco
(74) *Attorney, Agent, or Firm* — Pearne & Gordon LLP

(57) ABSTRACT

The invention relates to a handle (1) for actuating a device such as a video camera. The handle includes indentations (3) for accommodating the fingers of the user. An adjustment system (5, 7, 8, 9, 11) enables the width (11, 12, 13, 14) of at least a portion of said indentations to be modified in order to adapt it to the width of the user's fingers.

22 Claims, 3 Drawing Sheets

U.S. PATENT DOCUMENTS

| | | | | |
|---|---|---|---|---|
| 2009/0250917 | A1* | 10/2009 | Lenhart | 280/821 |
| 2010/0011540 | A1* | 1/2010 | Chen | 16/430 |
| 2011/0241992 | A1* | 10/2011 | Jameson | 345/161 |

FOREIGN PATENT DOCUMENTS

| | | | | |
|---|---|---|---|---|
| DE | 10004467 | A1 | | 6/2001 |
| JP | 05048944 | A | * | 2/1993 |
| JP | 05103239 | A | * | 4/1993 |
| JP | 2000075380 | A | * | 3/2000 |
| JP | 2002119179 | A | | 4/2002 |
| JP | 2003067127 | A | | 3/2003 |
| JP | 2004053791 | A | * | 2/2004 |
| JP | 2004117859 | A | * | 4/2004 |
| JP | 2006220867 | A | * | 8/2006 |

OTHER PUBLICATIONS

Translation of Japanese Publ. No. 2002-119179 A; Jul. 2012.*
International Search Report for PCT/EP2007/058870 dated May 28, 2008.
Office action mailed Mar. 27, 2012 for patent application JP2010-522194.

* cited by examiner

ADJUSTABLE HANDLE, PARTICULARLY FOR CAMERA

The present application is a continuation of international application PCT/EP2007/EP58870 filed on Aug. 27, 2007, the content of which being hereby included by reference.

TECHNICAL FIELD

The present invention relates to an adjustable handle for holding and controlling a device, notably a video camera.

STATE OF THE ART

Many devices have a handle intended both for carrying the device in one hand and for entering commands with one or several fingers. Among the different shapes of handles conceived, the revolver shape proves particularly ergonomic notably when the tool needs to be held at shoulder, neck or head height. Revolver handles thus generally have an approximately cylindrical prehension portion designed to be held between the palm of the hand and the fingers. Most often, this portion is held vertically, or inclined by less than 45° relative to vertical. The handle has a diameter sufficiently large for separating the extremities of the four fingers from the palm of the hand. In this position, the contact surface between the hand and the handle is considerable, which allows a firm hold and distributes the pressure on a considerable surface to avoid injuring the hand. The fingers are half-contracted, in a position that allows both the exertion of a considerable force and fine movements for pressing a button or a trigger under one or several fingers.

Revolver handles are notably adapted for many portable devices, including for example video cameras, electric tools such as drills, weapons etc. Similar handles can also be found in fixed devices, for example joysticks, machine controllers etc. The handles can be integrated to the controlled device or be linked removably to said device.

An example of removable handle for a video camera is described in U.S. Pat. No. 5,742,859. The handle described in this document comprises three buttons that can be actuated with the extremity of three fingers for controlling the zoom or other similar functions.

For more comfort and accuracy, the handles for apparatus that are to be carried for long periods sometimes have indentations for the fingers. These are concave locations designed to accommodate one or several fingers of a hand, for example only the index or all four fingers. The different indentations are separated by grooves that prevent the handle from sliding in the palm of the hand and thus improve its grip. An example of this type of handle is described in U.S. Pat. No. 4,984,084, which notably includes an indentation for the index.

The hands of the users can however be of very different sizes, for example when a device is intended to be used or sold regardless to children, women or adult men. Furthermore, it may also be desirable to use certain devices without removing gloves. However, the standard width of the indentations provided in usual handles does not suit the entire range of existing finger widths: the indentations are too wide and too far apart for the small hands of women and children and too narrow for many men.

Removable handles that can be replaced by a handle of a different size are known. It is however necessary to acquire and carry as many handles as there are potential users for the device, which is not very economical.

Handles in which only one part is replaced to adapt their size are also known. Again, in this case the possible dimensions of all potential users must be known in advance. Moreover, a fine adjustment between the standard dimensions offered by the manufacturer is not possible.

BRIEF SUMMARY OF THE INVENTION

One aim of the present invention is to propose a handle free from the limitations of the prior art, in particular a handle of the revolver or other type that can be adapted precisely to the user's hand.

According to the invention, these aims are achieved notably by means of a handle designed for actuating a device, having a plurality of indentations for the user's fingers and having an adjustment system for modifying the width of at least some of said indentations in order to adapt it to the width of the user's fingers.

This solution has notably the advantage over the prior art to allow the width of the indentations to be adjusted with a system integrated within the handle and without using external replacement parts.

In a preferred embodiment, haptic elements, for example buttons, can be integrated to the handle and move when the width of the indentations is adjusted. This feature makes it possible to ensure that the fingers remain opposite the buttons or haptic elements, even when the indentations' width and spacing are modified.

BRIEF DESCRIPTION OF THE FIGURES

Examples of embodiments of the invention are indicated in the description illustrated by the attached figures in which.

EXAMPLE(S) OF EMBODIMENTS OF THE INVENTION

The following description relates to the particular case of a removable handle for a video camera. The invention can however also be applied to handles that are integral to video cameras or to removable or fixed handles for different devices 6 or apparatus, for example for video cameras, photographic apparatus, electric tools, joysticks etc.

Figure 1:
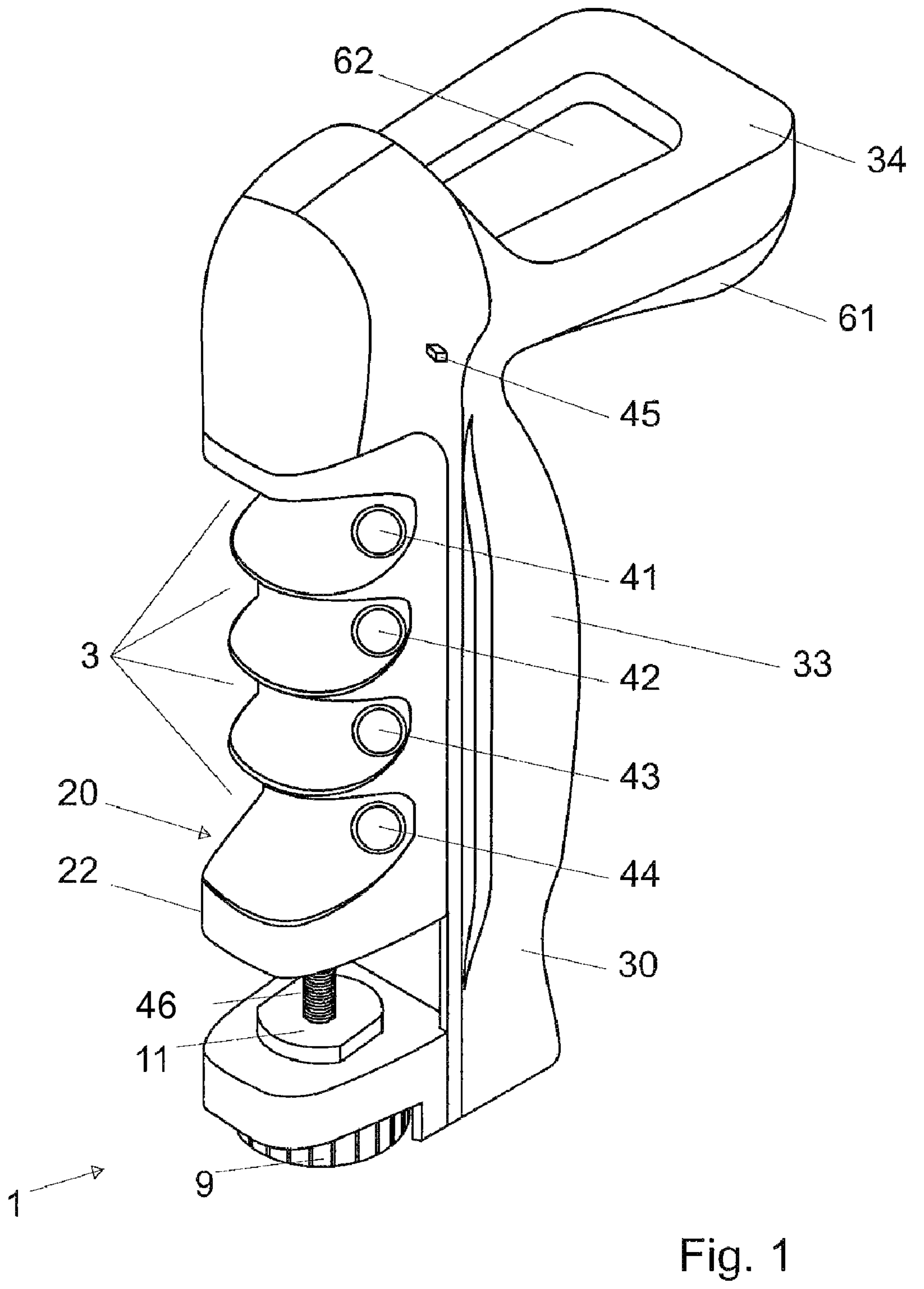
FIG. 1 illustrates a perspective view of a handle according to the invention.
Figure 2C:
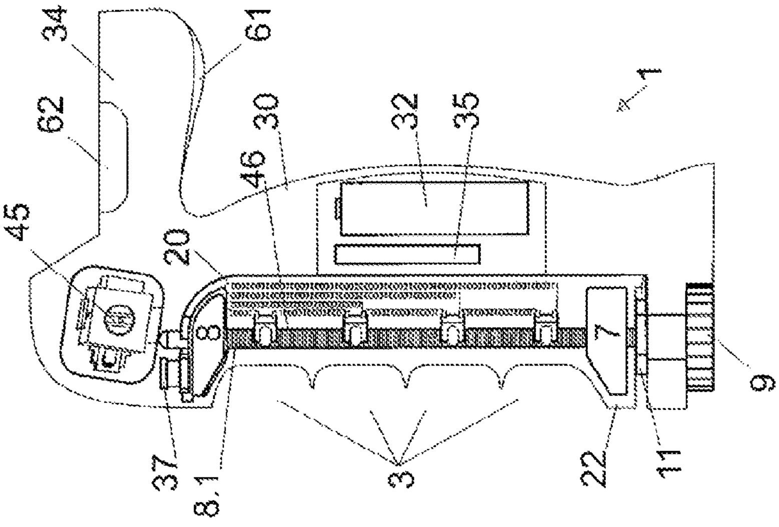
FIG. 2A to 2C illustrate a transparent side view of a handle according to the invention in three distinct adjustment positions.
Figure 2B:
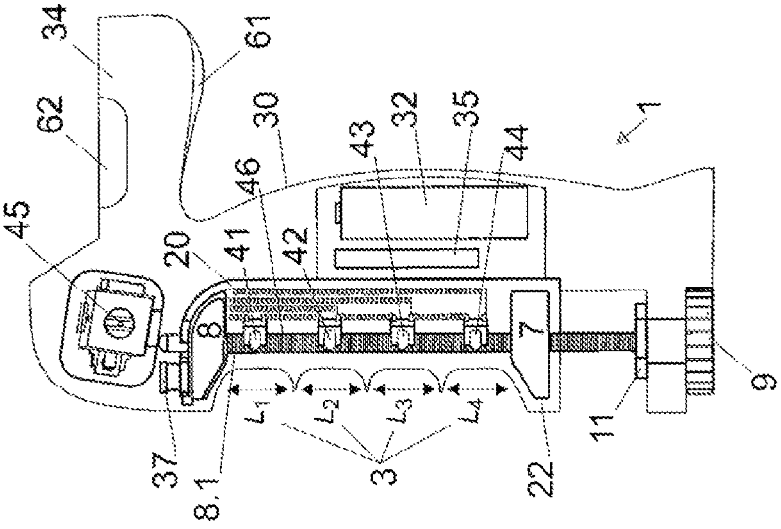
Figure 2A:
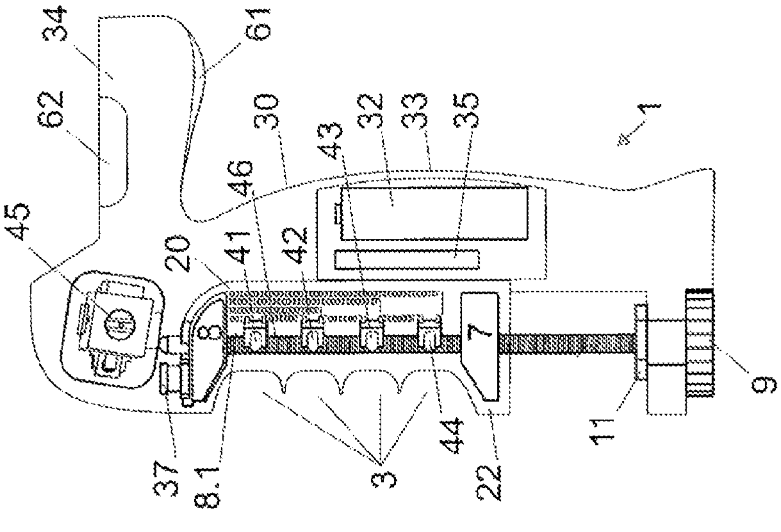

The handle illustrated by way of example in FIGS. 1 and 2 comprises a rigid portion 30, made for example of hard plastic, for example in the shape of an empty shell or of two half-shells assembled in a water-tight fashion by means of a filiform joint. This rigid portion 30 comprises a rounded zone 33 designed to rest against the vertical palm of the hand, and a soft additional element 61 for added comfort. A support zone 34 includes a fastening element 62 for fastening the handle to an external element, for example a video camera (not represented). Thus, the handle is preferably laid out or provided with fittings in order to enable it to be fastened on any useful support, for example on a tripod, a portable stabilizer for camera or a crane for example. Advantageously, the handle can also include a wrist-strap allowing the hand to go through it to secure the grip and prevent the handle or the handle-camera unit from falling.

The rigid portion 30 includes an electronic circuit powered by at least one cell or battery 32. The electronic circuit has components (not represented) mounted on a printed circuit 35 installed vertically on the figure, i.e. roughly parallel to the screw 46 described further below. A second printed circuit is lodged in the rigid portion 30, for example close to the support zone 34. This second printed circuit bears notably a haptic element 45 designed to be actuated by the thumb, for example a mono-stable or bi-stable switch or preferably a mini-joystick whose angle of inclination and/or direction determines the value of a controlled quantity. Other electronic components can be mounted on the second printed circuit. The haptic element 45 is connected to the printed circuit 35 described further below by conducting leads, for example by flexible or rigid leads (not represented). The handle 1 preferably includes a wired or wireless transmitter enabling the user's commands to be transmitted to a receiver 5 (FIG. 3) connected to the controlled device 6.

In one embodiment, the different electronic components can be distributed over a different number of printed circuits in the rigid or deformable part of the handle. Furthermore, the so-called rigid portion 30 can also be made fully or partly of silicon or of a deformable or compressible material.

The handle further comprises a deformable portion 20 connected to the rigid portion 30, in this example through an adjustment system including notably the screw 46. The deformable portion 20 extends in an essentially vertical direction in the figure and has in this example four indentations 3 to accommodate the four fingers of the hand (from the index to the small finger). Handles with a different number of indentations from 1 to 5 are also conceivable.

Haptic elements 41 to 44, for example mono-stable switches, are connected to the deformable portion 20 and designed to be actuated with the internal side of the fingers. It is of course also possible to provide a handle with fewer buttons on the handle, for example with a single button that can be actuated by the thumb or by the index, with two buttons etc.

The deformable portion 20 is preferably made of silicon or of another elastically deformable material that can be molded or injected. A screw 46 crosses the deformable portion 20 longitudinally (i.e. vertically in the figure). A part 7 serves as nut into which the screw 46 engages. The upper part of the screw 46 rests at the point 8.1 against the upper adjusting part 8. A lodgment in the hard part 30 provides hold to the part 8.

The parts 7 and 8 are of plastic or metal and are preferably covered by the silicon. The lower nut 7 inside the base 22 moves longitudinally when the screw 46 is turned, so as to compress or inversely reduce the compression of the silicon between the two parts 7, 8. For this purpose, the extremity of the screw is provided with an adjusting wheel 9 making it easier to grasp the screw. The adjusting wheel rests against a nut 11 inside the recess in which the deformable portion 20 is lodged.

By tightening the screw 46, the deformable portion 20 is compressed so as to modify the width L1, L2, L3, and L4, respectively, of the indentations 3 for the fingers (FIG. 2B), Buttons (or haptic elements) 41 to 44 held by the silicon also move so as to remain opposite the corresponding indentations. It is thus possible to adjust the width of the indentations 3 in continuous and reversible manner according to the user's fingers, without replacing any parts.

Haptic elements are connected electrically with the contact element 37 between the deformable part 20 and the rigid part 30 through flexible conductors integrated in the silicon. These conductors are preferably twisted (corkscrew-fashion) in the silicon, so that they can be stretched or, conversely, compressed without breaking. Conductors made of a bendy flexible and extensible material are also conceivable. In the rigid part, the connection between the contact element 37 and the printed circuits 35 is achieved by means of other conductors (not represented) that can be flexible or rigid.

In one embodiment, the contact element 37 is constituted by a detachable connector. This solution has the advantage of facilitating the final position of the deformable portion.

In order to avoid torsions or other undesirable deformations of the deformable portion 20, the silicon is preferably reinforced locally, for example at the base 22 or in the upper part, by rigid elements, for example of hardened silicon or of synthetic material. These rigid portions enable the directions along which the forces are transmitted when the handle is compressed to be controlled in order to contain the deformations of the handle. It is also possible to place rigid reinforcements in order to prevent deformations of the handle when it is gripped strongly by the user. Furthermore, it is also possible to integrate or mould-on reinforcements or other elements to the surface of the handle, for example to make it more comfortable, to contain the deformations of the silicon or for aesthetic reasons. The silicon of the deformable and/or rigid portion can be colored, for example with several colors. Advantageously, care will be taken that the greatest part of the hand rests on a silicon surface that is agreeable to the touch. A surface treatment can be applied to protect the silicon from ultraviolet rays or to make its surface softer.

Haptic elements 41 to 44 preferably include an elastic contact element (not represented), for example two metallic blades held apart by a spring, and a cap of silicon or elastomer going through the silicon of the deformable portion. The cap also ensures that the opening in the deformable portion is watertight. Pressing on the cap with the inside of the corresponding finger enables an electric contact to be established between the two metallic blades in order to let a current pass. This current is interpreted as a command by the electronic circuit mounted on the printed circuits 35. This command is transmitted in the form of a signal, for example a wireless signal, to the receiver 5 mounted on the device. Other types of binary or analog switches are conceivable.

In a preferred embodiment, the haptic elements 41-44 are not assigned to a particular function. The handle then behaves as a data input element enabling binary values to be entered by means of the buttons 41-44, and an instantaneous or integer value by means of the element 45. It is also conceivable to enter instantaneous or integer values with the fingers engaged in the indentations, for example by means of potentiometers or push-buttons.

The values entered are transmitted to the receiver 5 that converts them into control signals with a format adapted to the controlled device 6.

In the case of a handle 1 used for example to control a video camera, the receiver 5 could for example convert the received command signals into the LANC format, or any other suitable format, in order to manage functions such as: zoom-lens focusing, focus adjustment, light adjustment, switching from manual to automatic recording mode and back, controlling the motors of external devices associated with the camera etc.

The receiver includes an electronic circuit 51 to receive the signals from the handle and a microprocessor for interpreting them and converting them into commands for the device, for example in the LANC format in the case of a video camera. Other functions can be assigned to the buttons. It is for example also possible to enter value corrections by pressing several times on one of the buttons 41 to 44 in order to increment or decrement a controlled value. Furthermore, other commands can be entered by pressing several buttons simultaneously. The commands that have actually been sent to the controlled device can be modified by replacing or reprogramming the receiver 5.

It is also possible to associate the handle to a receiver 5 that converts the received commands into signals in a format different from the LANC format, for example into Control-M, RS232, RS422, IrdA or USB signals or any other interface for controlling a control system, a computer or an electronic device.

The connection between the handle 1 and the receiver can be accomplished according to a proprietary protocol or to a known protocol, for example Bluetooth, NFC, RS232, etc. In a preferred embodiment, the commands are transmitted over a wireless numeric connection. A cabled connection is also possible. The handle preferably shares a pairing code with the receiver so that a specific receiver accepts the commands from a single handle and not from non-paired handles. The receiver can be powered electrically by its own battery or through the controlled device 6 over the interfaces 60 and 50 of the device resp. receiver.

The receiver 5 is preferably of small size and volume so that it can be held on the device 6 simply by slotting it into the LANC or other connector 60. It is also possible to integrate the receiver into the device.

In a preferred embodiment, a simultaneous pressure on several buttons 41 to 44, for example a pressure on at least three buttons, generates a limited number of commands for the camera or the controlled device 6, for example a single command or no command. This allows the user to grasp the handle 1 strongly without generating an unwanted command.

The handle 1 can be offered for sale with different types of receivers 5 that can be selected by the user and are designed to work with different cameras or different other controlled devices.

Figure 3:
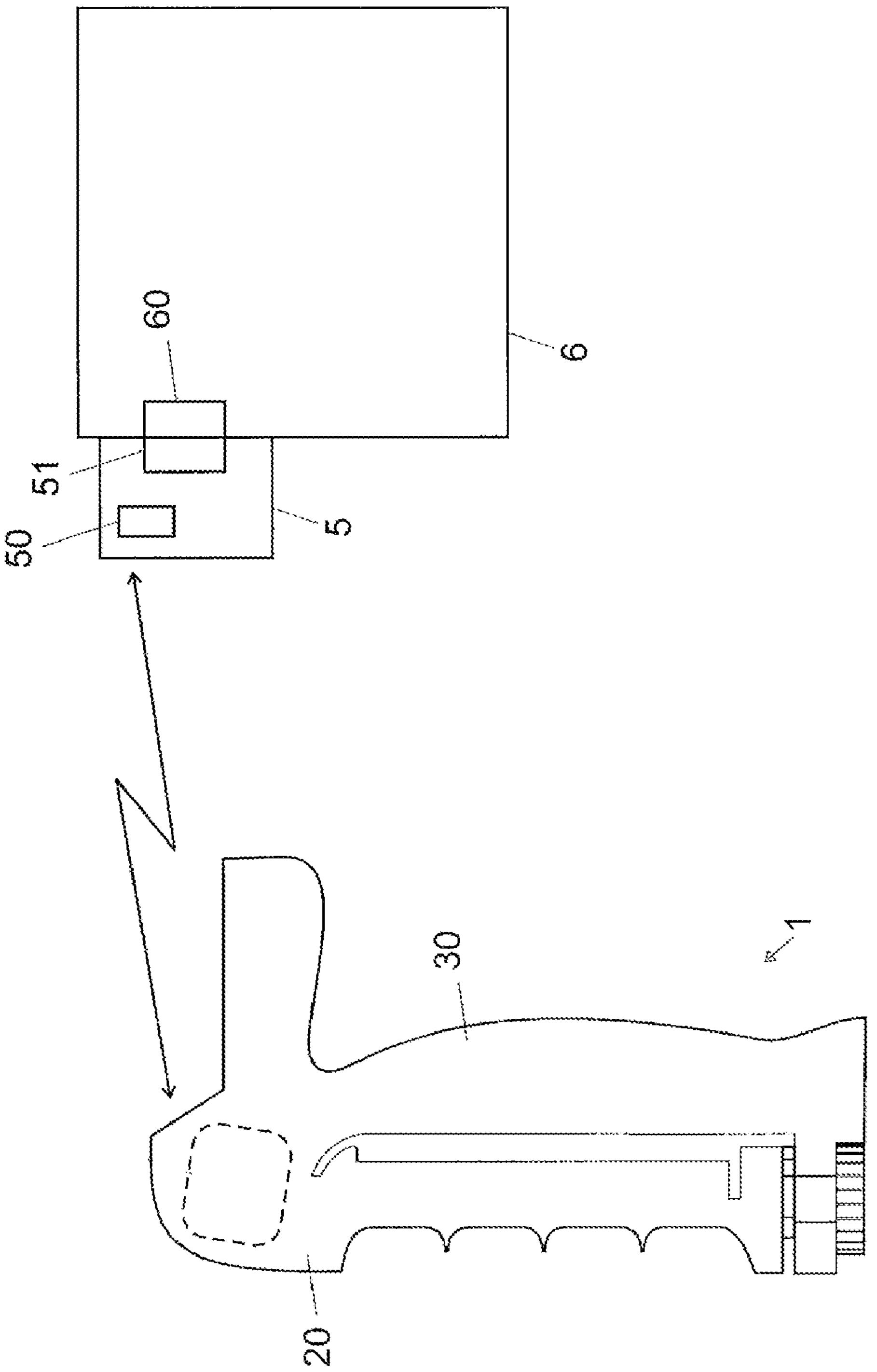
FIG. 3 illustrates diagrammatically a complete system with a handle, a receiver and a controlled device.

The inventive system comprises three distinct elements illustrated in particular in FIG. 3, i.e. a removable handle 1, a receiver 5 connected through a cabled or wireless interface to the handle, and a controlled device connected through a cabled or wireless interface to the receiver 5. This arrangement offers a maximum of flexibility and reconfiguration options. It is however also possible to forgo the receiver and to control the device directly through the handle, for example over a cabled or wireless interface (such as USB or Bluetooth) or by integrating the receiver 5 to the device. It is also possible within the frame of the invention to integrate the handle 1 to the controlled device 6 so that they form a single object. Finally, it is also possible to control with the haptic elements a device other than the one to which the handle is fastened.

The described handle has the advantage of being easily adaptable for very different hand sizes, simply by adjusting the screw 46. It can also be adapted for different devices or user preferences by replacing or reprogramming the receiver. The use of silicon makes it easier to achieve a watertight case (for example IP54 or better) in order to protect the electronic and mechanical elements in the handle from humidity and foreign matter.

REFERENCE NUMBERS USED IN THE FIGURES

1 Handle
3 Indentations
5 Screw of the adjustment system
7 Lower sliding nut of the adjustment system
8 Fixed upper part of the adjustment system
8.1 Resting point of the screw 5 against the part 8
9 Adjusting wheel
11 Nut
20 Deformable portion
22 Lower base of the deformable portion
30 Rigid portion
32 Power from cell or battery or externally
33 Rounded zone
34 Support zone
35 Printed circuit
37 Connector between the deformable portion and the rigid portion
41-44 Haptic elements connected to the indentations (for example mono-stable buttons or buttons giving a non-binary value)
45 Haptic element for the thumb
5 Receiver
50 Receiver interface
51 Electronic circuit of the receiver
6 Device
60 Device interface
61 Soft additional element
62 Fastening element to an external element

The invention claimed is:

1. Handle for actuating a device, including:
a plurality of indentations for the fingers of a user,
an adjustment system enabling the width of at least a portion of said indentations to be modified in order to adapt it to the width of said user's fingers, the adjustment system including an element enabling the width of the indentations to be modified by screwing or unscrewing, and
at least one element capable of being actuated by one of the user's fingers, the at least one element moves when the width of the indentations is adjusted,
wherein the handle is constituted at least partially of an elastically deformable material capable of reverting to its original shape after a deformation, said adjustment system enabling the compression of said material to be deformed or modified in order to modify said width of the indentations.

2. The handle of claim 1, said adjustment system being adapted for adaptation of said width of the indentations without disassembling or replacing parts.

3. The handle of claim 1, said adjustment system enabling a continuous adaptation of said width of the indentations.

4. The handle of claim 1, said elastically deformable material being on a silicon basis.

5. The handle of claim 1 having a deformable portion provided with said indentations and made at least partially of said elastically deformable material,
said adjustment system being arranged for adjusting the compression of said deformable portion.

6. The handle of claim 5, including a rigid portion designed to be held in the palm of the hand and allowing the handle to be connected to said device.

7. The handle of claim 1, wherein the at least one element capable of being actuated by one of the user's fingers includes at least one haptic element, the at least one haptic element designed to be actuated by one of the fingers lodged in one of said indentations.

8. The handle of claim 7, having four distinct indentations for accommodating the index, the middle finger, the ring finger and the small finger, and several haptic elements designed to be actuated each by one of these fingers.

9. The handle of claim 7, having at least one haptic element designed to be actuated by the thumb.

10. The handle of claim 1, wherein the adjustment system maintains a selected width of the indentations.

11. The handle of claim 1, wherein the adjustment system includes a screw extending in the direction of the handle length.

12. The handle of claim 1, wherein the adjustment system includes a screw that changes the width of the indentations.

13. The handle of claim 12, wherein the adjustment system includes an adjustment wheel connected to the screw.

14. Handle for actuating a device, including:
a plurality of indentations for the fingers of a user,
an adjustment system enabling the width of at least a portion of said indentations to be modified in order to adapt it to the width of said user's fingers, the adjustment system including an element enabling the width of the indentations to be modified by screwing or unscrewing, and
a rigid portion accommodating a cell or a battery for storing energy, an electronic circuit for interfacing with said device or a receiver, and a haptic element designed to be actuated by the thumb,
wherein the handle is constituted at least partially of an elastically deformable material capable of reverting to its original shape after a deformation, said adjustment system enabling the compression of said material to be deformed or modified in order to modify said width of the indentations, and
wherein said deformable portion being connected to said rigid portion by means of said adjustment system.

15. A system including:
a handle for actuating a device, and a receiver, the handle comprising
a plurality of indentations for the fingers of a user, and
an adjustment system enabling the width of at least a portion of said indentations to be modified in order to adapt it to the width of said user's fingers, the adjustment system including an element enabling the width of the indentations to be modified by screwing or unscrewing;
at least one element capable of being actuated by one of the user's fingers, the at least one element moves when the width of the indentations is adjusted; and
wherein the handle, is associated with said receiver, said receiver being intended to work with said device controlled by said handle.

16. The handle of claim 15, said receiver including an electronic circuit for receiving and converting command signals entered with said handle into control signals of said device or of another device.

17. The handle of claim 15, associated with said receiver over a wireless interface.

18. Handle for actuating a device, the handle comprising:
a plurality of indentations for the fingers of a user,
an adjustment system enabling the width of at least a portion of said indentations to be modified in order to adapt it to the width of said user's fingers, the adjustment system including an element enabling the width of the indentations to be modified by screwing or unscrewing, and
at least one element capable of being actuated by one of the user's fingers, the at least one element moves when the width of the indentations is adjusted,
wherein the handle is a pistol shape.

19. System including:
a handle for actuating a device, the handle comprising
a plurality of indentations for the fingers of a user,
an adjustment system enabling the width of at least a portion of said indentations to be modified in order to adapt it to the width of said user's fingers, the adjustment system including an element enabling the width of the indentations to be modified by screwing or unscrewing, and
at least one element capable of being actuated by one of the user's fingers, the at least one element moves when the width of the indentations is adjusted; and
a receiver connected to said handle over a cabled or wireless interface and provided with a cabled or wireless interface for controlling an external device according to the commands entered with said handle.

20. The system of claim 19, wherein said receiver can be reprogrammed.

21. The system of claim 20, including several receivers that can be associated to a same handle for controlling different devices over different types of interface.

22. Handle for actuating a device, comprising:
a deformable portion made at least partially of an elastically deformable material, the deformable portion includes a plurality of indentations for the fingers of a user;
an adjustment system enabling the width of at least a portion of the indentations to be modified in order to adapt it to the width of the user's fingers the adjustment system including an element enabling the width of the indentations to be modified by screwing or unscrewing; and
a rigid portion designed to be held in the palm of the user's hand and allowing the handle to be connected to the device, the rigid portion accommodating a cell or a battery for storing energy, an electronic circuit for interfacing with the device or a receiver, and a haptic element designed to be actuated by the thumb,
wherein the elastically deformable material is capable of reverting to its original shape after a deformation, said adjustment system enabling the compression of said material to be deformed or modified in order to modify said width of the indentations.

* * * * *